United States Patent
Kraft et al.

(10) Patent No.: US 7,430,424 B2
(45) Date of Patent: Sep. 30, 2008

(54) MOBILE COMMUNICATION METHOD AND TERMINAL

(75) Inventors: Christian Kraft, Kgs Lyngby (DK); Hannu Konttinen, Helsinki (FI); Auli Inkala, Oulu (FI); Tiina Hynninen, Oulu (FI); Marika Vuorenmaa, Espoo (FI); Timo Sivula, Tampere (FI); Jari Selenius, Espoo (FI)

(73) Assignee: Nokia Corporation, Espoo (FI)

( * ) Notice: Subject to any disclaimer, the term of this patent is extended or adjusted under 35 U.S.C. 154(b) by 450 days.

(21) Appl. No.: 11/119,412

(22) Filed: Apr. 29, 2005

(65) Prior Publication Data

US 2006/0246927 A1   Nov. 2, 2006

(51) Int. Cl.
*H04Q 7/20* (2006.01)

(52) U.S. Cl. .................................. 455/466; 455/414.1

(58) Field of Classification Search .............. 455/414.1, 455/413, 412, 3.06, 466; 379/387.01; 370/20, 370/24, 71
See application file for complete search history.

(56) References Cited

U.S. PATENT DOCUMENTS

| | | | | |
|---|---|---|---|---|
| 6,138,146 | A * | 10/2000 | Moon et al. ................. | 709/206 |
| 6,711,154 | B1 * | 3/2004 | O'Neal ....................... | 370/352 |
| 7,155,241 | B2 * | 12/2006 | Helferich .................... | 455/458 |
| 2007/0135134 | A1 * | 6/2007 | Patrick ..................... | 455/456.1 |

* cited by examiner

*Primary Examiner*—Naghmeh Mehrpour
*Assistant Examiner*—Melody Mehrpour
(74) *Attorney, Agent, or Firm*—Perman & Green, LLP

(57) ABSTRACT

In a mobile communication terminal, message content and recipient information is received input from a user during a message creation process. After receiving a triggering signal indicating an end of the message creation process, the message content and the recipient information is analyzed. The analysis results in a indication of a most suitable transmission service for transmitting the message content to the recipient. Then the message content is transmitted via the most suitable message transmission service.

18 Claims, 3 Drawing Sheets

MOBILE COMMUNICATION METHOD AND TERMINAL

TECHNICAL FIELD

The present invention relates to a method, an apparatus, a system as well as a computer program for controlling a mobile communication terminal when transmitting messages.

BACKGROUND

Mobile telephones and the digital mobile communication systems in which they communicate have evolved during the last few years from systems capable of simple voice communication devices to present day intelligent communication systems having processing and communication capabilities that were almost unimaginable not long ago. A mobile telephone of today is better termed as a mobile communication terminal, not least because of the fact that, typically, it is capable of conveying messages of virtually any kind to and from other terminals in the mobile network as well as terminals or stations in connected networks. For example, a mobile communication terminal is typically equipped with applications and supporting control software that render it capable of sending and receiving small text messages (e.g. SMS in GSM/GPRS systems), multi media messages containing text, sound and image data (e.g. MMS in GSM/GPRS systems) as well as e-mail applications that correspond in terms of functionality with any type of e-mail application in a typical computer workstation.

Nevertheless, from the viewpoint of a typical user, such a "multi communication capable" mobile communication terminal may seem complex and not very flexible to use.

For example, when deciding to send a message to a recipient, the user is typically required to initiate a message creation process by deciding which kind of message to create and send. That is, before creating the message, the user is effectively forced to select the type, format and size of the message to be sent. Needless to say, this is a situation which typically is perceived as non-flexible.

SUMMARY OF THE INVENTION

An object of the present invention is hence to overcome the drawbacks related to message creation and transmission in a mobile communication terminal.

This object is achieved by way of a method, a mobile communication terminal, a system and a computer program according to the appended claims.

In a mobile communication terminal, message content and recipient information is received having been input by a user during a message creation process. After receiving a triggering signal indicating an end of the message creation process, the message content and the recipient information is analyzed. The analysis results in a indication of a most suitable transmission service for transmitting the message content to the recipient. Then the message content is then transmitted via the most suitable message transmission service.

Instead of, or in addition to, being performed after receiving a triggering signal, the analysis may be performed during the message creation process, i.e. performed while the user edits the message content and/or the recipient information.

In preferred embodiments, the analysis of the message content comprises analyzing the amount of the message content and/or the type of the message content. The analysis of type of content may involve analyzing whether the message content is plain text or formatted text. The analysis of the type of the message content may comprise analyzing whether the message content comprises sound or a picture, for example an individual image or a video sequence.

By analyzing whether the recipient information comprises a mobile telephone number or an electronic mail address it is possible to determine whether the transmission is to be effectuated via a short message service, a multi media messaging service, a fax service or via an electronic mail service.

That is, the invention overcomes the drawbacks of prior art by being able to decide, while receiving input from a user "in the background", what kind of message the user is creating. In the case the message content is text only and the recipient information includes a mobile phone number, an SMS service is typically selected to transmit the message content. Depending on the amount of text, i.e. the number of symbols, the message is transmitted in one or more SMS-messages. When there is any formatting and/or multi media content added to the message content and the recipient information includes a mobile phone number, an MMS service or an e-mail service may be selected. Fax may also be used if the recipient phone number is associated with a fax machine or at least a fax reception service.

If the user selects a recipient, e.g. from a list of recipients in a "phone book", that is not associated with a mobile phone number but only with en e-mail address, an e-mail service is used for transmission of the message content, irrespective of whether or not the message content contains text only or any multi media attachment. An e-mail service that utilizes SMS as a carrier service is also feasible.

In addition to analyzing the message content intended for transmission, the analysis may also comprise determining whether or not it is technically possible, i.e. if the service is available at the time, to use a particular service or if it is more or less expensive for the user and/or the recipient to use a particular transmission service; and selecting the service as the most suitable service based also on such a determination. Moreover, it is also feasible to analyse whether or not an adjustment of the content, e.g. a resealing of an image, removal of text formatting etc., would yield a more suitable transport service in terms of, e.g., cost. Possibly, a suggestion of postponing transmission of the message content until a most suitable transport service is available could be presented to the user, who then confirms whether or not such a delay is acceptable.

Regarding the determining of a most suitable transport service based on cost for the user and/or the recipient, this may be realized in terms of a pre-selected parameter indicating to the analysis process that, e.g., the user intends to always use the least expensive transport service available at any time. Moreover, as the usage of so-called "pre-paid subscription cards" increases, the analysis may also include checking whether or not the user has enough money available on the card to use the most suitable service from a technical point of view, or if the amount of money available is enough only for a less suitable service and that the message content is adjusted in order to fit transmission via the less suitable service.

Other aspects of the present invention are to provide a mobile communication terminal comprising control and communication circuitry configured to perform the method described above as well as a system comprising terminals and a computer program comprising computer program code that, when executed in a computer device, performs the method described above.

An advantage of the invention is that the user does not, need to be concerned with any decision-making based on the kind of message content that is being prepared for transmission. That is, the invention facilitates control of message transmission and adds flexibility.

DETAILED DESCRIPTION OF PREFERRED EMBODIMENTS

Figure 1:
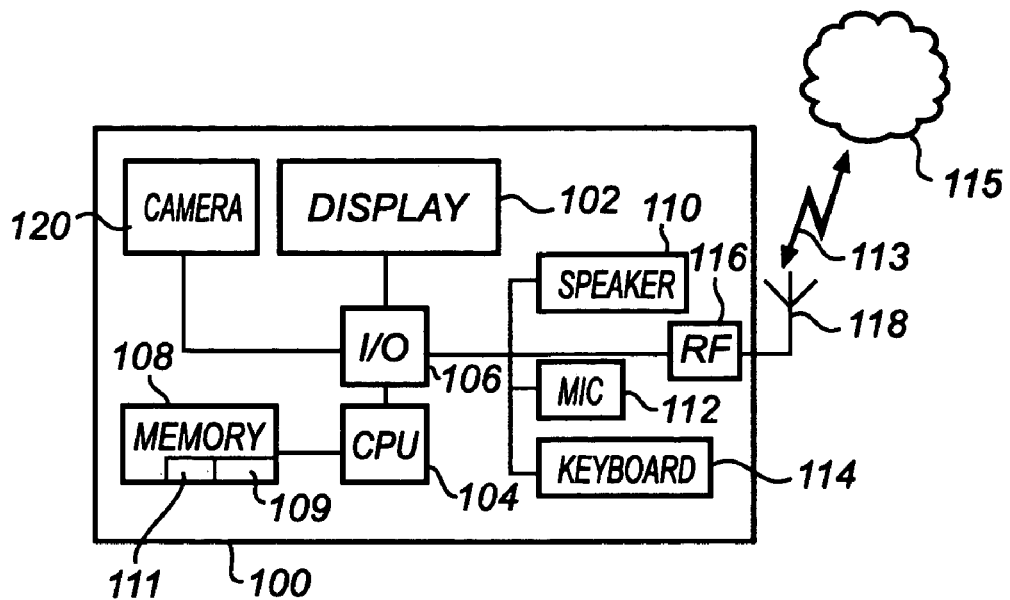
FIG. 1 shows a schematically drawn block diagram of an embodiment according to the present invention.

FIG. 1 illustrates schematically a mobile communication terminal 100 in which the present invention is implemented. The terminal 100 is capable of communication via an RF-unit 116 and an antenna 118 through an air interface 113 with a mobile (radio) communication system 115 such as the well known systems GSM/GPRS, UMTS, CDMA 2000 etc.

The terminal 100 comprises a processor 104, memory 108 as well as input/output units in the form of a speaker 110, a microphone 112, a keyboard 114 and a camera 120. The input/output units communicate with the processor 104 through an I/O-interface 106. The details regarding how these units communicate are known to the skilled person and is therefore not discussed further. The communication terminal 100 may be in the form of a mobile telephone as well as a Personal Digital Assistant (PDA) equipped with radio communication means.

The method according to the preferred embodiments of the present invention will in general reside in the form of software instructions of a computer program 109 with an associated memory area 111, together with other software components necessary for the operation of the terminal 100, in the memory 108 of the terminal 100. The computer program 109 may be resident or it may be loaded into the memory 108 from a software provider, e.g. via the air interface 113 and the network 115, by way of methods known to the skilled person. The program 109 will be executed by the processor 104, which will receive and process input data from the different units in the terminal 100. As will be discussed further below, input data in the form of text via the keyboard 114, sound via the microphone 112 and pictures via the camera 120 is processed in order to be included into messages that are transmitted from the terminal 100.

Figure 2:
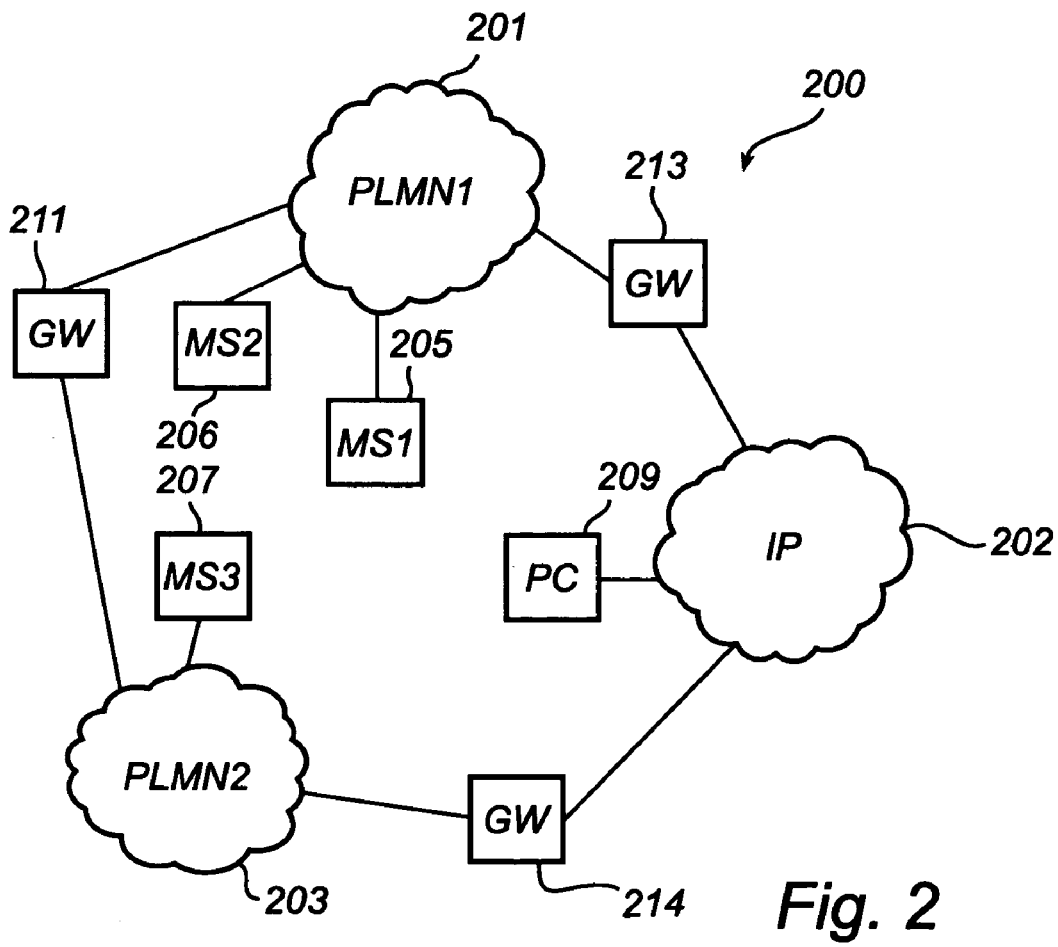
FIG. 2 illustrates schematically a communication network in which an embodiment of a mobile communication terminal according to the present invention is operating.

FIG. 2 is a schematical block diagram of a system 200 comprising components that are utilized while realizing the present invention. Naturally, many more components exist in the system, but these have deliberately been left out as they are known in the art and would only obscure the description of the present invention. There are three networks shown: a first public land mobile network (PLMN) 201, an Internet Protocol network 202 and a second public land mobile network (PLMN) 203.

The first PLMN 201 may be of any type including, but not restricted to, CDMA2000, D-AMPS, GSM, UMTS, EDGE, etc. A first mobile communication terminal 205 and a second mobile communication terminal 206 are shown connected to the first PLMN 201. As the skilled person will realize, these two communication terminals 205, 206 may be of the kind described above in connection with FIG. 1 and be configured to transmit messages as will be discussed below.

As known in the art, gateways 211, 213, 214 are configured to interconnect the public land mobile networks 201 and 202 with each other and with other networks.

The Internet Protocol (IP) network 202 may be a local area network or a global network, such as the Internet, or any other IP-based network. Connected to the IP-network is a computer 209, such as a personal computer, a hand held computer etc, which is configured to receive e-mail messages transmitted from any mobile communication terminal, e.g. terminal 100, as described below.

As known in the art, the IP-network is connected to the other networks through appropriately configured gateways 213, 214.

The second PLMN 203 may be of any type including, but not restricted to, CDMA2000, D-AMPS, GSM, UMTS, EDGE, etc. Specifically the second PLMN 203 does not need to be of the same type as the first PLMN 201. Connected to the second PLMN 203 is a third mobile communication terminal 207. The third terminal 207 is configured such that it is capable of exchanging messages with any of the terminals 205, 206 and the computer 209 through the interconnected networks and gateways.

Figure 3:
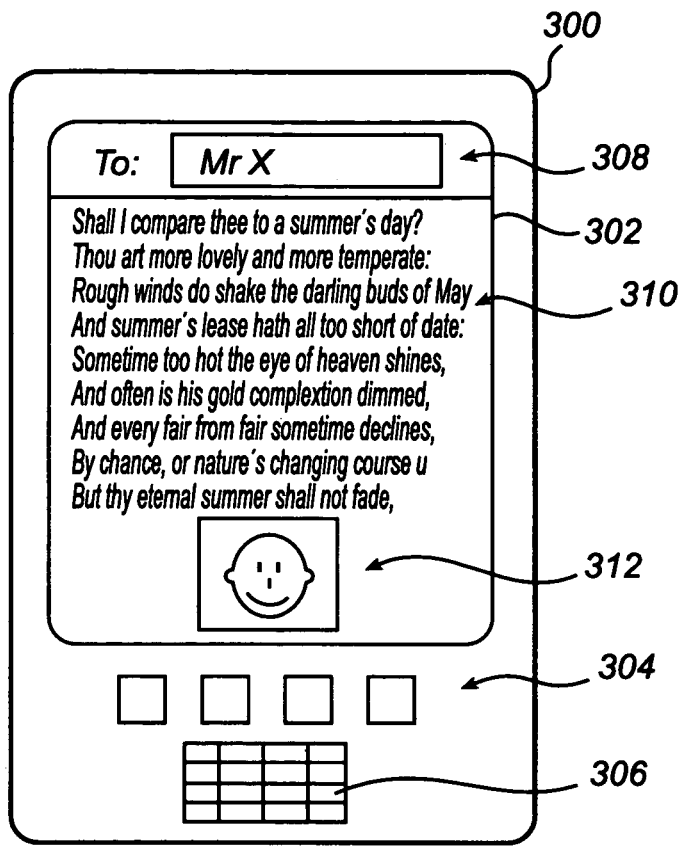
FIG. 3a illustrates schematically a user interface of a mobile communication terminal according to the present invention.
FIG. 3b illustrates schematically contents of a phone book in a mobile communication terminal according to the present invention.
Figure 4:
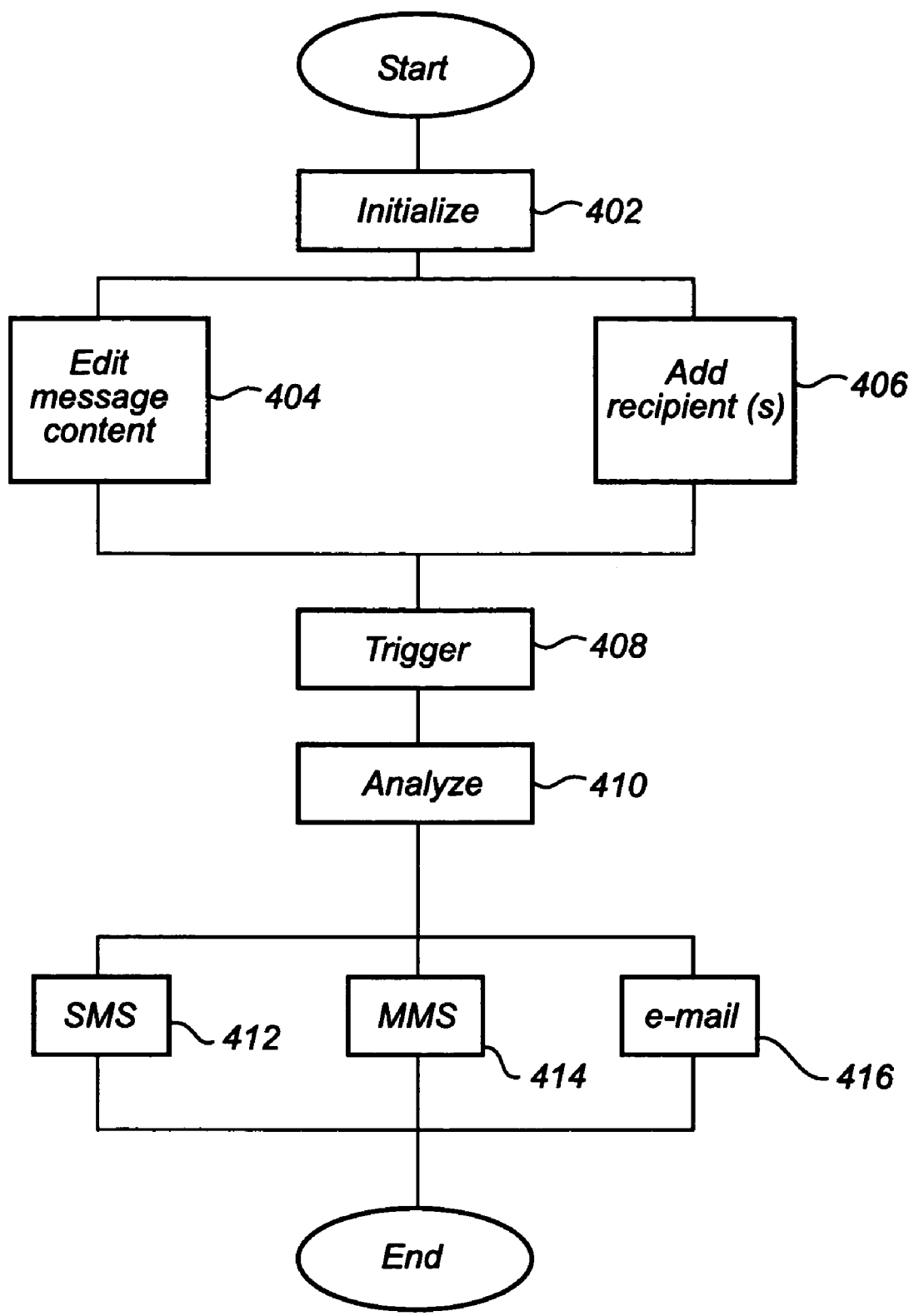
FIG. 4 is a flow chart illustrating an embodiment of a method according to the present invention.

Turning now to FIG. 3a, 3b and 4, a method according to the present invention will be described. The description will be from the viewpoint of a user using a communication terminal 300 comprising similar functional blocks and configured in a manner similar to any one of the terminals 100, 205, 206, 207 described above.

The communication terminal 300 comprises a display 302, control keys 304 and a keypad 306. FIG. 3a illustrates a situation where a user of the terminal 300 has started and initialized a message creation process in an initialization step 402. The display 302 shows a recipient field 308 displaying a selected recipient "Mr X", which the user has added during an add recipient step 406. The addition of the recipient has been performed by the user by way of, e.g., manipulating the control keys 304 in order to select the recipient from a list of recipients 320, e.g. a "phone book" database in the memory (cf. 111 in FIG. 1). As is illustrated in FIG. 3b, the list of recipients 320 is arranged in rows 328, 330, 332 and columns 322, 324, 326 and comprises at least three recipients "Mr X", "Ms Y" and "Mr Y" being associated with mobile telephone numbers as column 324 illustrates and associated with e-mail addresses as column 326 illustrates. Not all recipients are associated with both a mobile phone number and an e-mail address. For example, "Ms Y" is only associated with an e-mail address and "Mr Y" is only associated with a mobile phone number. Although not shown in FIG. 3a, any number of recipients may be added during the add recipient step 406.

The user has also created an amount of message content in the form of text 310 and graphics 312, during an edit message step 404. The text 310 has been entered by way of the user typing on the keypad 306. The graphics 312 is in the form of a picture, which may have been recorded by a camera (not shown in FIG. 3a) or imported from a database of pictures already present in the terminal 300. Although not shown in FIG. 3a, the message content may also comprise a sound sequence recorded via a microphone or imported from a database comprising sound, as well as a video sequence.

As illustrated in FIG. 3a, the steps of editing the message content 404 and the step of adding one or more recipients 406 may be performed in parallel or in sequence, as desired by the user.

When the user is satisfied that the message content and the recipient or recipients are correct, the user triggers the end of the message creation process in a triggering step 408. The actual triggering is performed by way of pressing a control key 304 and thereby providing a signal to the control software of the terminal 300.

The triggering step 300 triggers an analysis during an analyzing step 410. During the analysis, the message content and the recipient information is examined and this results in an indication of a most suitable transmission service for transmitting the message content to the recipient.

Instead of, or in addition to, being performed after receiving a triggering signal, the analysis may be performed during the message creation process, i.e. performed while the user edits the message content and/or the recipient information.

The analysis of the message content is performed, for example, in terms of amount of text 310, or in terms of whether or not the text 310 is formatted, i.e. comprises control characters etc. In the exemplified situation in FIG. 3a, the text is formatted in that it is reproduced in a specific type font. Moreover, the analysis 410 recognizes that the message content also comprises a picture 312.

The analysis of the recipient information entails recognizing that "Mr X" is the intended recipient and that, by consulting the list of recipients 320, "Mr X" is associated with both a mobile phone number and an e-mail address. Hence, the recipient "Mr X" is capable of receiving messages via an SMS transmission service as well as an MMS transmission service and also capable of receiving messages via an e-mail transmission service.

The analysis finds that using an SMS transmission service is not appropriate or suitable, since the message content is more complex than plain text in that it is formatted and comprises a picture. However, the analysis finds that MMS is an appropriate and suitable service to use for transmission of the message content, since the MMS supports transmission of both formatted text messages as well as pictures. Although the use of an e-mail transmission service also would be suitable, in the preferred embodiment described here, the MMS service is selected as the most suitable service to use. Naturally, in other embodiments of the invention, the use of an e-mail service may be regarded as the most suitable. In fact, it may be foreseen that the terminal is provided with a set of default settings that include a setting that imposes a priority sequence regarding which transmission service to use in cases where an analysis of a message reveals that more than one transmission service is suitable.

Finally, the message content is transmitted via the most suitable transmission service in an MMS transmission step 414, as decided during the analysis step 410, where the MMS transmission step 414 is selected in favour of an SMS transmission step 412, and an e-mail transmission step 416.

The invention claimed is:

1. A method of controlling message transmission in a mobile communication terminal, comprising:
   receiving message content and recipient information input from a user during a message creation process,
   receiving a triggering signal indicating an end of the message creation process,
   analyzing the message content and the recipient information, said analyzing resulting in an indication of a most suitable transmission service for transmitting the message content to the recipient, and
   transmitting the message content via said most suitable message transmission service.

2. The method according to claim 1, where said analysis of the message content comprises analyzing the amount of said message content.

3. The method according to claim 1, where said analysis of the message content comprises analyzing the type of said message content.

4. The method according to claim 3, where said analysis of the type of said message content comprises analyzing whether the message content is plain text.

5. The method according to claim 3, where said analysis of the type of said message content comprises analyzing whether the message content comprises formatted text.

6. The method according to claim 3, where said analysis of the type of said message content comprises analyzing whether the message content comprises sound.

7. The method according to claim 3, where said analysis of the type of said message content comprises analyzing whether the message content comprises a picture.

8. The method according to claim 1, where said analysis of the recipient information comprises analyzing whether the recipient information comprises a mobile telephone number.

9. The method according to claim 1, where said analysis of the recipient information comprises analyzing whether the recipient information comprises an electronic mail address.

10. The method according to claim 1, where said transmission is effectuated via a short message service.

11. The method according to claim 1, where said transmission is effectuated via a multi media messaging service.

12. The method according to claim 1, where said transmission is effectuated via a fax service.

13. The method according to claim 1, where said transmission is effectuated via an electronic mail service.

14. The method according to claim 1, where said analysis further includes analysis whether or not a transport service is available.

15. The method according to claim 1, where said analysis further includes analysing a cost to use a transport service.

16. A mobile communication terminal comprising control and communication circuitry configured to perform the method according to claim 1.

17. A mobile communication system, comprising at least two communication terminals as claimed in claim 16.

18. A computer program comprising computer program code that, when executed in a computer device, performs the method according to claim 1.

* * * * *